United States Patent [19]
Davis et al.

[11] Patent Number: 5,582,890
[45] Date of Patent: *Dec. 10, 1996

[54] MINERAL FILLED HEAT SEAMABLE ROOF SHEETING

[75] Inventors: James A. Davis, Uniontown; Joseph K. Valaitis, Brecksville, both of Ohio

[73] Assignee: Bridgestone/Firestone, Inc., Akron, Ohio

[ * ] Notice: The term of this patent shall not extend beyond the expiration date of Pat. No. 5,370,755.

[21] Appl. No.: 430,443

[22] Filed: Apr. 28, 1995

Related U.S. Application Data

[62] Division of Ser. No. 793,888, Nov. 18, 1991.

[51] Int. Cl.$^6$ .............................. B32B 3/02; C08K 3/10; E04D 5/00
[52] U.S. Cl. .................. 428/57; 428/58; 428/61; 428/290; 524/427; 524/437; 524/442; 524/445; 524/449; 524/451; 156/71; 156/157; 156/159; 156/308.2; 156/308.4
[58] Field of Search .................... 524/427, 445, 524/451, 437, 449, 442; 428/57, 58, 61, 290; 156/71, 157, 159, 308.2, 308.4

[56] References Cited

U.S. PATENT DOCUMENTS

| | | | |
|---|---|---|---|
| 5,162,436 | 11/1992 | Davis et al. | 525/97 |
| 5,242,970 | 9/1993 | Davis et al. | 524/492 |
| 5,370,755 | 12/1994 | Davis et al. | 156/71 |

Primary Examiner—Paul R. Michl
Assistant Examiner—Olga Asinovsky
Attorney, Agent, or Firm—Frank J. Troy, Sr.

[57] ABSTRACT

A heat seamable sheet material for roofing prepared from an uncured polymeric composition of matter which comprises 100 parts by weight of a semi-crystalline polymer and selected from the group consisting of polyolefins prepared from monomers containing at least 2 carbon atoms; from about 20 to 300 parts by weight of one or more non-black mineral fillers per 100 parts of the polymer; and from about 20 to 150 parts by weight of a processing material, per 100 parts of the polymer. The non-black mineral fillers may include hard clays, soft clays, calcined clays, chemically modified clays, mica, talc, alumina trihydrates, calcium carbonate, titanium dioxide, amorphous precipitated hydrated silica and mixtures thereof. The processing material may be any non-volatile oil, i.e., a paraffinic processing oil. Also provided is a method for covering a roof comprising the steps of applying layers of heat seamable sheet material, prepared from an uncured non-black mineral filled polymeric composition of matter, to the roof being covered; overlapping adjacent edges of the layers; and heating the overlapped areas to slightly above the softening point of the sheet material and seaming the overlapped areas under sufficient pressure to provide an acceptable seam strength, the composition of matter having sufficient self-adhesion without the use of an adhesive.

10 Claims, No Drawings

MINERAL FILLED HEAT SEAMABLE ROOF SHEETING

This application is a division of application Ser. No. 07/793,888, filed Nov. 18, 1991.

TECHNICAL FIELD

The present invention relates generally to sheeting material used for roofing. More particularly the sheeting material is comprised of non-black mineral fillers such as soft and hard clays, chemically modified clays, calcium carbonate, titanium dioxide, silicon dioxide and the like and elastomers such as ethylene-propylene-diene terpolymer, referred to herein as EPDM, ethylene-propylene rubber, referred to herein as EPR, ethylene-butene copolymer or similar olefinic type polymer, and mixtures thereof.

BACKGROUND OF THE INVENTION

Polymeric roof sheeting is used as single ply roofing membranes for covering industrial and commercial flat roofs. Such membranes are generally applied to the roof surface in vulcanized or cured state.

Because of outstanding weathering resistance and flexibility, cured EPDM based roof sheeting has been rapidly gaining acceptance. This material normally is prepared by vulcanizing the composition in the presence of sulfur or sulfur containing compounds such as mercaptans. Our earlier U.S. Pat. No. 4,803,020 also teaches the use of radiation crosslinking promoters in an EPDM sheeting composition which can be cured by ionizing radiation.

Notwithstanding the usefulness of radiation curing and sulfur curing, a disadvantage of utilizing these elastomers is the lack of adhesion of EPDM, especially cured EPDM, to itself. Besides being highly labor intensive, this lack of adhesion poses a serious problem because, in applying EPDM sheets to a roof, it is usually necessary to splice the cured EPDM sheets together. This splice or seam area is subjected to both short term and long term stresses such as those caused by roof movement, heavy winds, freeze-thaw cycling and thermal cycling. Such stresses may manifest themselves in shear forces or peel forces, i.e., the seam peels back under severe stress conditions or results in a partially open seam (often referred to as a fish-mouth condition) under less severe conditions.

In view of the foregoing problem, it has been necessary to utilize an adhesive to bond the cured EPDM sheets together. As will be evident from the above discussion, an adhesive for bonding cured EPDM elastomer roofing sheets together must meet a number of requirements which are extremely difficult to satisfy. Thus, the adhesive must provide sufficient peel and adhesive strength to permit the splice formed by bonding the cured EPDM roofing sheets together to resist both the short term and long term stresses such as those discussed hereinabove. Moreover, the adhesive must be resistant to oxidation, hydrolysis and chemical attack from ponded water. Additionally, the adhesive must provide the important property often referred to in the adhesive art as "Quick Stick". The term "Quick Stick" means the characteristic of two sheets of material which have been coated with an adhesive composition to develop virtually immediate adhesive strength when placed in contact with each other.

Quick Stick is an extremely important property in an adhesive which is utilized to splice cured EPDM elastomer roofing sheets together. Thus, adhesive compositions presently known generally require anywhere from about two (2) to about seven (7) days at room temperature (i.e. 22° C.) to attain maximum adhesive strength. At higher ambient temperature, this time period may be somewhat less but at a minimum it will generally be at least 24 hours. The conventional procedure for splicing the EPDM roofing sheets together is to make the splice within a relatively short period of time after the adhesive coating has been applied to each sheet, generally within 30 minutes but often less. Accordingly, the adhesive composition must provide sufficient immediate adhesive strength or Quick Stick to permit the splice to withstand stresses from winds, movement, handling by installers, etc. until the adhesive achieves its maximum strength which as indicated will generally take from two (2) to seven (7) days.

Commercial contact adhesives which are conventionally employed for bonding cured EPDM elastomer roofing sheets together generally consist of solutions of neoprene or neoprene-type or butyl or butyl-type polymers in aromatic or aromatic-aliphatic solvents containing 2-butanone often along with tackifying resins. However, such adhesives, in isolation, have not proved to be very satisfactory due to their lower than desired peel adhesion strengths. Thus, the neoprene or butyl-type adhesives often provide peel adhesion values at 22° C. of only 1 to 2 pounds per linear inch.

Pressure sensitive and contact adhesive compositions containing neutralized, partially neutralized or unneutralized sulfonate elastomers, tackifying resins and organic solvents or organic solvent mixtures are known in the prior art as shown by U.S. Pat. Nos. 3,801,531 and 3,867,247.

U.S. Pat. No. 3,801,531 relates to pressure sensitive adhesive compositions which contain thiouronium derivatives of unsaturated elastomers or neutralized, partially neutralized or unneutralized sulfonated elastomers including sulfonated EPDM, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

U.S. Pat. No. 3,867,247 relates to adhesive contact cements which contain neutralized, partially neutralized or unneutralized sulfonated butyl elastomers, tackifying resins including phenol formaldehyde or alkylphenol formaldehyde resins and organic solvents or organic solvent mixtures including a preferred 90:10 mixture of toluene and isopropyl alcohol. However, the patent does not disclose or suggest the use of alkylphenols or ethoxylated alkylphenols in such compositions.

The adhesive compositions described in the aforementioned patents suffer from a significant disadvantage which materially limits their usefulness as a contact adhesive for bonding cured EPDM elastomer roofing sheets together and that is their deficiency in Quick Stick properties.

One such adhesive system for EPDM elastomers that provides good Quick Stick is described in U.S. Pat. No. 4,480,012, owned by the Assignee of record herein. Such adhesives comprise a neutralized sulfonated EPDM elastomeric terpolymer; an organic hydrocarbon solvent; a para-alkylated phenol formaldehyde tackifying resin and an alkylphenol or ethoxylated alkylphenol. While the use of such adhesive compositions is an effective means of joining and sealing the edges of elastomeric roofing material, if the use of adhesives could be eliminated, the additional labor material costs and related hardware necessary to apply the adhesive would effect a significant cost savings. Moreover, elimination of the need to cure the material prior to its application to a roof would also be advantageous.

SUMMARY OF THE INVENTION

It is thus an object of the present invention to provide heat seamable EPDM and EPR roof sheeting materials, wherein non-black mineral fillers replace, either partially or completely, traditional carbon black fillers.

It is another object of the present invention to provide heat seamable EPDM and EPR roof sheeting materials which have improved peel and adhesion strength over the conventional EPDM/EPR roof sheeting comprising only black fillers, the improvement being present at room temperatures and elevated temperatures.

It is still another object of the present invention to provide a white, heat seamable EPDM/EPR roof sheeting material.

It is a further object of the present invention to provide EPDM/EPR roof sheeting materials as described above, having highly improved sunlight reflectance.

Yet another object of the present invention is to provide EPDM/EPR roof sheeting as described above, having good burn resistivity.

It is still another object of the present invention to provide EPDM/EPR roof sheeting as described above, having improved weathering and excellent resistance to discoloration.

In general, the present invention provides a heat seamable sheet material for roofing prepared from an uncured polymeric composition of matter which comprises 100 parts by weight of a semi-crystalline polymer and selected from the group consisting of polyolefins prepared from monomers containing at least 2 carbon atoms; from about 20 to 300 parts by weight of one or more non-black mineral fillers per 100 parts of the polymer; and from about 20 to 150 parts by weight of a processing material, per 100 parts of the polymer.

The present invention also provides a method for covering a roof comprising the steps of applying layers of heat seamable sheet material, prepared from an uncured non-black mineral filled polymeric composition of matter, to the roof being covered; overlapping adjacent edges of the layers; and heating the overlapped areas to slightly above the softening point of the sheet material and seaming the overlapped areas under sufficient pressure to provide an acceptable seam strength, the composition of matter having sufficient self-adhesion without the use of an adhesive.

At least one or more of the foregoing objects which shall become apparent to those skilled in the art are described in greater detail with reference to the specification which follows.

PREFERRED EMBODIMENT OF THE INVENTION

As noted hereinabove, the roof sheeting materials of the present invention comprise EPDM and EPR. The term EPDM is used in the sense of its definition as found in ASTM-D-1418-85 and is intended to mean a terpolymer of ethylene, propylene and a diene monomer with the residual unsaturation portion of the diene in the side chain. Illustrative methods for preparing such terpolymers are found in U.S. Pat. No. 3,280,082 and British Pat. No. 1,030,289, the disclosures of which are incorporated herein by reference. The preferred polymers having from about 60 to 95 weight percent ethylene and from about zero to about 12 weight percent of the diene with the balance of the polymer being propylene or some other similar olefin type polymer. Also, the polymers are semi-crystalline which results from having more than about 2 percent by weight crystallinity. Accordingly, amorphous (non-crystalline) EPDM and EPR polymers may not possess adequate thermoplastic properties during the formation of a seam using heat and some pressure, to be suitable for practice of the present invention.

The diene monomer utilized in forming the EPDM terpolymer is preferably a non-conjugated diene. Illustrative examples of non-conjugated dienes which may be employed are dicyclopentadiene; alkyldicyclopentadiene; 1,4-pentadiene; 1,4-hexadiene; 1,5-hexadiene; 1,4-heptadiene; 2-methyl- 1,5-hexadiene; cyclooctadiene; 1,4-octadiene; 1,7-octadiene; 5-ethylidene-2-norbornene; 5-n-propyl idene-2-norbornene; 5-(2-methyl-2-butenyl)-2-norbornene and the like. A typical EPDM is EPsyn® MDE-249 an experimental terpolymer having a Mooney Viscosity (ML/4 at 125° C.) of about 56; an ethylene/propylene (E/P) ratio of 71/29 weight percent and 1.7 weight percent of unsaturation (5-ethylidene-2-norbornene).

The term EPR is used in the sense of its definition as found in ASTM D-1418-85 and is intended to mean a copolymer of ethylene and propylene. The preferred copolymers contain from about 60 to 95 weight percent ethylene with the balance to total 100 weight percent being propylene. A typical EPR is Vistalon® 719 (Exxon Chemical Co.) having an E/P ratio of about 75/25 weight percent.

Also, useful as a roofing material in the present invention is a copolymer of ethylene and butene. This particular copolymer has about 82 weight percent ethylene with the balance to total 100 weight percent being butene. A typical ethylene/butene copolymer is GERS-1085 (Union Carbide Corporation) having a $\overline{M}w$, as measured by GPC of at least about 221,000. Other similar olefinic polymers (e.g., ethylene/octene copolymer) can be used to practice this invention. For purposes of discussion herein, references to polymers is intended to include any of the EPDM, EPR or similar olefinic polymers of the present invention.

The composition or compound employed to form the roof sheeting material comprises 100 parts by weight of EPDM, EPR, or other similar olefinic type copolymers, including mixtures of the two, to which are added mineral fillers as total or partial replacement for traditionally used black fillers, and processing materials as well as optionally other components, all of which are discussed hereinbelow.

With respect first to the non-black mineral fillers, suitable fillers are selected from the group comprising of hard clays, soft clays, chemically modified clays, mica, talc, alumina trihydrates, calcium carbonate, titanium dioxide, amorphous precipitated hydrated silica and mixtures thereof. These fillers may, either partially or completely replace "black" fillers, i.e. carbon black and other related petroleum-derived materials.

Some four basic types of clays are normally used as reinforcing fillers for rubber elastomers. The different types of clay fillers include; airfloated, water washed, calcined and surface treated or chemically modified.

The airfloated clays are the least expensive and most widely used. They are divided into two general groups, hard and soft, and offer a wide range of reinforcement and loading possibilities. Hard Clays are used in the amount of about 20 parts to about 300 parts per 100 parts of polymer(phr), preferably in an amount from about 65 to 210 phr. The preferred range of hard clays (65 to 210 phr) is about equal to the amount of carbon black normally used in preparing sulfur cured EPDM roof sheeting. Any commercially available hard clay may be used. The preferred airfloated hard clays used are: Suprex®, Barden R®; LGB® all commercially available from J. M. Huber Corporation.

The airfloated soft clays are used in the amount of about 20 parts to about 300 parts per 100 parts of polymer(phr), preferably in an amount from about 75 to 235 phr. The preferred range of soft clays (75 to 235 phr) is also about equal to the amount of carbon black normally used in preparing sulfur cured EPDM roof sheeting. The preferred airfloated soft clays used are Paragon®; Hi-White R®, and K-78® commercially available from J. M. Huber Corporation.

Water washed clays are normally considered as semi-reinforcing fillers. This particular class of clays are more closely controlled for particle size by the water-fractionation process. This process permits the production of clays within controlled particle size ranges. The preferred ranges of water washed clays are very similar to the preferred amounts of airfloated soft clays mentioned hereinabove. Some of the preferred water washed clays include Polyftl® DL, Polyfil® F, Polyfil® FB, Polyfil® HG-90, Polyfil® K and Polyfil® XB, all are commercially available from J. M. Huber Corporation.

The third type of clay includes the calcined clay. Clays normally contain approximately 14 percent water of hydration, and most of this can be removed by calcination. The amount of bound water removed determines the degree of calcination. The preferred ranges of calcined clays are very similar to the preferred amounts of airfloated hard clays mentioned hereinabove. Some of the preferred calcined clays include Polyfil® 40, Polyfil® 70, and Polyfil® 80, all commercially available from J. M Huber Corporation.

The final type of clay includes the chemically modified reinforcing clays. Cross-linking ability is imparted to the clay by modifying the surface of the individual particles with a polyfunctional silane coupling agent. Chemically modified clays are used in the amount of about 20 parts to about 300 parts per 100 parts of polymer(phr), preferably in an amount from about 60 to 175 phr. The preferred range of chemically modified clays (60 to 175 phr) is about equal to the amount of carbon black normally used in preparing sulfur cured EPDM roof sheeting. Normally the specific gravity of most clays is about 2.60 at 25° C. The preferred chemically modified clays are commercially available from J. M. Huber Corporation and include: Nucap® 100, Nucap® 200, Nucap® 190, Nucap® 290, Nulok® 321, Nulok® 390 and Polyfil® 368.

Other useful non-black fillers include amorphous silica (silicon dioxide). Silicas are generally classed as wet-process, hydrated silicas because they are produced by a chemical reaction in water, from which they are precipitated as ultrafine, spherical particles. Silica can be employed in the amount of about 20 parts to about 110 parts per 100 parts of polymer(phr), preferably in an amount from about 20 to 75 phr. The useful upper range is limited by the high viscosity imparted by fillers of this type. The preferred range of silica (25 to 75 phr) is about equal to the amount of carbon black normally used in preparing sulfur cured EPDM roof sheeting. Some of the commercially available silicas which may be used include: Hi-Sil® 215, Hi-Sil® 233, Hi-Sil® EP and Silene® D all produced by PPG Industries. Also, a number of useful commercial grades of different silicas are available from J. M. Huber Corporation.

Finely ground calcium carbonate is employed in the amount of about 20 parts to about 300 parts per 100 parts of polymer(phr), preferably in an amount from about 35 to 125 phr. The preferred range of finely ground, high brightness calcium carbonate (35 to 125 phr) is about equal to the amount of carbon black normally used in preparing sulfur cured EPDM roof sheeting. Calcium carbonate generally has a specific gravity of about 2.71 and is commercially available from a number of suppliers including Harwick Chemical, J. M. Huber Corporation, Georgia Marble, Genstar Stone Products and Omya, Inc.

Titanium dioxide is employed in the amount of about 5 parts to about 140 parts per 100 parts of polymer(phr), preferably in an amount from about 10 to 90 phr. Both the rutile and anatase form of titanium dioxide may be used, however, the rutile form is preferred and includes such products as TiPure® R-960, which is a fine, white powder having a specific gravity of 3.90 and commercially available from DuPont Co.

Other commercially available non-black mineral fillers that may be employed to practice this invention include; talc (magnesium silicate), mica (mixtures of sodium and potassium aluminum silicate) and alumina trihydrate. Alumina trihydrate is also used a flame retardant and smoke suppressant in EPDM roof sheeting.

With respect to the processing material, it is included to improve the processing behavior of the composition (i.e. reduce mixing time, enhance pigment incorporation, and increase the rate of sheet forming). The processing oil is included in an amount ranging from about 20 parts to about 150 parts process oil per 100 pans EPDM ingredient phr, preferably in an amount ranging from about 60 parts to about 100 phr. A preferred processing oil is a paraffinic oil, e.g. Sunpar 150 which is available from the Sun Oil Company. Other petroleum derived oils including naphthenic oils may be used.

Optional ingredients include, for example, other elastomers (e.g., butyl elastomer, neutralized sulfonated EPDM, neutralized sulfonated butyl) in place of minor amounts of the EPDM, secondary inorganic fillers (e.g., talc, mica, clay, silicates, whiting) with total secondary filler content usually ranging from about 10 to about 65 phr, and conventional amounts of other conventional additives, such as zinc: oxide, stearic acid, antioxidants, antiozonants, flame retardants, and the like.

The compounding ingredients can be admixed, utilizing an internal mixer (such as a Banbury mixer), an extruder, and/or a two-roll mill, or other mixers suitable for forming viscous, relatively uniform admixtures. When utilizing a type B Banbury internal mixer, in a preferred mode, the dry or powdery materials such as the non-black mineral fillers of the present invention are added first, followed by the liquid process oil and finally the polymer (this type of mixing can be referred to as an upside-down mixing technique).

The resulting admixture is sheeted to thickness ranging from 5 to 200 mils, preferably from 35 to 60 mils, by conventional sheeting methods, for example, milling, calendering or extrusion. Preferably, the admixture is sheeted to at least 40 gauge (0.040 inches) which is the minimum thickness specified in standards set by the Roofing Council of the Rubber Manufacturers Association for non-reinforced EPDM rubber sheets for use in roofing applications. In many cases, the admixture is sheeted to 40–45 gauge thickness since this is the thickness for a large percentage of "single-ply" roofing membranes used commercially. The sheeting can be cut to the desired length and width dimensions at this time.

In order to demonstrate the practice of the present invention, several EPDM compounds were prepared and subjected to both peel and shear adhesion tests, as will now be set forth in detail. The EPDM terpolymer selected was EPsyn® MDE-249. For purposes of comparison, a sulfur cured conventional black EPDM compound (Example No. 1) was evaluated. This compound was prepared with the EPDM Vistalon® MD-744. A typical EPDM is Vistalon® MD-744 (Exxon Chemical) a terpolymer having a Mooney Viscosity (ML/4 at 125° C.) of about 52; an ethylene/propylene (E/P) ratio of 61/39 weight percent and 2.7 weight percent of unsaturation. Examples No. 2–10 were all non-black mineral filled EPDM compounds according to the present invention, prepared using EPsyn® MDE-249, and Example No. 1, the sulfur cured conventional black EPDM membrane control, was prepared utilizing standard rubber mixing techniques and equipment by mixing together the following ingredients: 100 parts EPDM terpolymer, 130 phr carbon black, 88 phr paraffinic process oil, 4 phr zinc oxide, 1 phr stearic acid, 0.9 phr sulfur and 3.3 phr rubber curing ingredients. The remaining nine compounds (Example Nos. 2–10) provide membranes according to the present invention and comprise the elastomer, the fillers, the processing oil and Tinuvin 327, a substituted benzotriazole available from Ciba-Geigy Chemical. Formulations for each of the examples appear in Table I, below with all parts per hundred parts of rubber hydrocarbon (phr) by weight, unless otherwise specified.

The following tables and examples are submitted for the purpose of further illustrating the nature of the present invention and are not to be considered as a limitation on the scope thereof.

TABLE I

Conventional and Heat Seamable Membrane Formulations

| Example No. | 1[a] | 2 | 3 | 4 | 5 | 6 | 7 | 8 | 9 | 10 |
|---|---|---|---|---|---|---|---|---|---|---|
| EPsyn ® MDE-249 | — | 100 | 100 | 100 | 100 | 100 | 100 | 100 | 100 | 100 |
| Vistalon ® MD-744 | 100 | — | — | — | — | — | — | — | — | — |
| Nucap ® 100 Clay[b] | — | 75 | 90 | 110 | 125 | — | — | 140 | 160 | 185 |
| HiWhite R ® Clay[c] | — | — | — | — | — | 90 | 125 | — | — | — |
| Titanium Dioxide | — | 15 | 10 | 15 | 10 | 15 | 10 | 15 | 15 | 15 |
| HiStr GPF black | 130 | — | — | — | — | — | — | — | — | — |
| Sunpar 2280 oil | 88 | — | — | — | — | — | — | — | — | — |
| Sunpar 150 oil | — | 55 | 60 | 70 | 75 | 70 | 80 | 70 | 70 | 70 |
| Tinuvin 327[d] | — | 1.5 | 1.5 | 1.5 | 1.5 | 1.5 | 1.5 | 1.5 | 1.5 | 1.5 |
| Zinc oxide | 4 | — | — | — | — | — | — | — | — | — |
| Stearic acid | 1 | — | — | — | — | — | — | — | — | — |
| Sulfur | .90 | — | — | — | — | — | — | — | — | — |
| Cure package | 3.3 | — | — | — | — | — | — | — | — | — |
| Total | 327.2 | 246.5 | 261.5 | 296.5 | 311.5 | 276.5 | 316.5 | 326.5 | 346.5 | 371.50 | a) Sulfur cured conventional black EPDM membrane
b) Nucap 100 clay is chemically modified clay treated with a silane coupling agent (sp. gr. 2.6)
c) HiWhite R ® clay is an untreated soft airfloated clay (sp. gr. 2.6)
d) Tinuvin 327 is a substituted benzotriazole, commercially available from Ciba-Geigy Chemical.

EPDM terpolymer (Copolymer Rubber & Chemical Co.) having a Mooney Viscosity (ML/4 at 125° C.) of about 56; an ethylene/propylene (E/P) ratio of 71/29 weight percent and 1.7 weight percent of unsaturation.

Physical testing data such as stress-strain properties and die C tear properties are provided in Table II hereinbelow.

TABLE II

Conventional and Heat Seamable Membranes - Unaged Physical Properties

| Example No. | 1[a] | 2 | 3 | 4 | 5 | 6 | 7 | 8 | 9 | 10 |
|---|---|---|---|---|---|---|---|---|---|---|
| Stress-Strain Properties at 23° C. | | | | | | | | | | |
| 100% Modulus, psi | 470 | 140 | 195 | 150 | 190 | 135 | 145 | 205 | 300 | 325 |
| 300% Modulus, psi | 1120 | 315 | 605 | 295 | 445 | 230 | 275 | 430 | 635 | 700 |
| Tensile at break, psi | 1435 | 795 | 785 | 585 | 1030 | 675 | 745 | 885 | 1055 | 985 |
| Elongation at break, % | 420 | 735 | 435 | 660 | 870 | 760 | 705 | 575 | 555 | 460 |
| Die C Tear at 23° C. | | | | | | | | | | |
| Lbs/inch | 221 | 144 | 161 | 144 | 161 | 105 | 104 | 161 | 179 | 177 | a) Sulfur cured conventional black PEDM membrane

For testing purposes, dumbbell shaped specimens were cut from individual milled 45 mil flat sheets according to ASTM D-412 (Method A-dumbbell and straight). Modulus, tensile strength and elongation at break measurements were obtained using a table model Instron® Tester, Model 1130, and the test results were calculated in accordance with ASTM D-412. All dumbbell specimens were allowed to set for about 24 hours, following which testing was carried out at 23° C.

Tear properties of milled 45 mil flat rubber sheets cut with a die C (90° angle die) were determined in accordance with ASTM Method D-624. Die C tear specimens were not nicked prior to testing. Tear resistance, in lbs/inch, was obtained using a table model Instron® Tester, Model 1130 and the test results were calculated in accordance with ASTM Method D-624. Testing was again carried out at 23° C.

As evident from the values reported in Table II, physical properties for Examples No. 2–10 were generally lower than the control, Example No. 1, with the exception of elongation at break, which was much higher for the non-black mineral filled EPDM membranes. However, increases in modulus, tensile strength and die C tear resistance were apparent at the higher clay loadings.

In Tables III and IV, the control test sample (Example No. 1) was prepared using a sulfur cured conventional black EPDM membrane seamed with a butyl-based lap splice adhesive developed by Uniroyal Chemical and identified as SA-1065. After sufficient air-drying time (usually less than 30 minutes) the peel and shear seams were formed by hand using a two-inch wide metal hand roller and some pressure. Heat was not used to form the adhesive prepared seams. The control test membrane was a sulfur cured conventional black EPDM membrane which is commercially available from Firestone Building Products Company and marketed as a RUBBERGARD® roofing membrane. The test results of the seam peel an seam shear adhesion tests are set forth in Tables III and IV.

Seam peel adhesion and seam shear strength for Examples 2–10 were conducted according to the test procedure outlined next with actual measured values being reported in Tables III and IV, respectively.

DETAILED PEEL AND SHEAR ADHESION TEST PROCEDURE

Each of the above rubber compounds was subjected to adhesion testing which necessitated the building of test pads comprising 6×6 inch sheets reinforced by a fiber reinforcement scrim, according to the following procedure:

1. A 10×20-inch two roll mill was utilized to prepare a number of 6×6-inch sheets of rubber approximately 40 mils in thickness for building adhesion test pads.

2. In order to reinforce the uncured sheets of rubber, a 6×6-inch sheet of PVC treated polyester scrim (10×10 epi cord construction) was inserted between two 6×6-inch sheets of rubber.

3. The rubber-scrim assembly was covered with a layer of a Mylar film and placed in the cavity of a metal curing mold (6×6×0.075-inch).

4. The rubber-scrim assembly was then pressed in a Mylar film for about five minutes at about 149° C.

5. Two of the 6×6-inch scrim reinforced rubber pads were seamed together using a hand-held heating gun (Leister). Approximately 15 to 18 pounds force was supplied by means of a roller such as a standard two-inch wide metal roller. Satisfactory seams (either peel or shear) could be formed using only 3 to 4 pounds force and the standard two-inch wide rubber roller. The seams were allowed to equilibrate for 24 hours before testing.

6. A clicker machine with a one-inch wide die was utilized to prepare a number of test specimens for seam peel (Type B, 90° peel) and shear (Type A, 180° peel) adhesion testing.

7. Testing machine: Model 1130 Instron® Universal Tester—a testing machine of the constant rate-of-jaw separation type. The machine was equipped with suitable grips capable of clamping the specimens firmly and without slippage throughout the tests.

8. The one-inch wide specimens were tested at the rate (both crosshead and chart speed) of two inches per minute using the adhesion test set forth in ASTM D-413 (machine method). Both peel and shear adhesion strength were determined at room temperature (i.e., 23° C.) as well as occasionally at 70° and 100° C. Specimens were allowed 15 minutes to preheat prior to testing at elevated temperatures.

9. Adhesion strength is defined as: peel adhesion strength (lbs./inch)=pounds force×sample width; shear adhesion strength (lbs./square inch)=pounds force×sample width.

TABLE III

| Conventional and Heat Seamable Membrane - Seam Peel Adhesion Study | | | | | | | | | | |
|---|---|---|---|---|---|---|---|---|---|---|
| Unaged seams Heat setting #9 (442° C.) Example No. | 1[a] | 2 | 3 | 4 | 5 | 6 | 7 | 8 | 9 | 10 |
| Membrane Seam Interply Peel Adhesion at 23° C. | | | | | | | | | | |
| lbs/inch | 13 | >42 | >39 | >42 | >49 | >37 | >38.5 | >39 | >36 | >47 |
| type of failure | (A) | (B) | (B) | (B) | (B) | (B) | (B) | (B) | (B) | (B) |
| Membrane Seam Interply Peel Adhesion at 50° C. - 15 minute preheat at 50° C. | | | | | | | | | | |
| lbs/inch | 7.25 | >12.5 | >9.5 | >9 | >12 | >8.5 | >10 | >13 | 12 | >14 |
| type of failure | (A) | (B) | (B) | (B) | (B) | (B) | (B) | (B) | (B) | (B) | a) Sulfur cured conventional black EPDM membrane
(A) Adhesive Failure - separation between the plies
(B) Slight tearing at ply-to-ply interface, followed by rubber tearing to the fabric reinforcement (rubber-to-fabric failure)

TABLE IV

Conventional and Heat Seamable Membranes - Seam Shear Strength Study

Unaged Seams
Heat setting #9 (442° C.)

| Example No. | 1a | 2 | 3 | 4 | 5 | 6 | 7 | 8 | 9 | 10 |
|---|---|---|---|---|---|---|---|---|---|---|
| Membrane Seam Shear Strength at 23° C. | | | | | | | | | | |
| lbs/square inch | 27 | >36 | >35 | >35 | >38 | >38 | >32 | >39 | >44 | >40 |
| type of failure | (A) | (C) | (C) | (C) | (C) | (C) | (C) | (C) | (C) | (C) |
| Membrane Seam Shear Strength at 50° C. - 15 minute preheat at 50° C. | | | | | | | | | | |
| lbs/square inch | 18.5 | >12 | >11 | >11 | >14 | >12 | >11 | >24 | >27 | >19.5 |
| type of failure | (A) | (C) | (C) | (C) | (C) | (C) | (C) | (C) | (C) | (C) |
| Membrane Seam Shear Strength at 70° C. - 15 minute preheat at 70° C. | | | | | | | | | | |
| lbs/square inch | 11.5 | >7.5 | >8 | >8.5 | >9.5 | >6.5 | >7.5 | — | — | — |
| type of failure | (A) | (C) | (C) | (C) | (C) | (C) | (C) | — | — | — | a) Sulfur cured conventional black EPDM membrane
(A) Adhesive Failure - separation between the plies
(C) Membrane Necking and eventually breaking adjacent to the weld seam Peel adhesion as shown in Table III for the sulfur cured conventional EPDM membrane control (Example No. 1) at 23° C. was 13 lbs/inch, while seam shear strength at 23° C. in Table IV was 27 lbs/square inch. A substantial reduction in both peel and shear adhesion resulted when the one-inch wide test samples were tested at elevated temperatures (i.e., 50° C. and 70° C.). In the peel adhesion test, failure during testing occurred at the interface of the seam. Test failures of this type are commonly referred to as adhesive failures. In the seam shear strength tests, failure of the sulfur cured EPDM membrane also occurred at the interface of the seam. The control test samples (Example No. 1) were prepared using a sulfur cured conventional black EPDM membrane seamed with a butyl-based lap splice adhesive developed by Uniroyal Chemical and known as SA-1065. The sulfur cured conventional black EPDM membrane is commercially available from Firestone Building Products Company and marketed as a RUBBERGARD® roofing membrane.

The membranes of the present invention (Nos. 2–10) exhibited rubber tearing to the fabric reinforcement and rubber-to-fabric failure during the seam peel strength test. In the seam shear strength test, the fabric reinforced membrane fails by stretching or necking and eventually breaks or tears adjacent to the weld seam. None of the heat seamable membranes (Example Nos. 2–10) showed any separations at the interface of the fabric reinforced roofing membranes.

As can be determined from the data presented in Tables III and IV, peel adhesion and shear adhesion values were generally significantly better for the non-black clay filled heat seamable membranes (Example Nos. 2–10) which were based on EPsyn® MDE-249 as compared to the adhesive seamed sulfur cured conventional EPDM membrane (Example No. 1). The test samples listed in Tables III and IV were tested at a crosshead and chart speed of two inches per minute using a Model 1130 Instron® Universal Tester in accordance with the adhesion test set forth in ASTM D-413. Seam peel and shear strengths were measured at room temperature (23° C.) as well as 50° C. and 70° C.

In conclusion it is to be understood that the invention is not limited to the specific types of EPDM exemplified herein or by the disclosure of other typical EPDM, EPR or other semi-crystalline olefin type polymers provided herein, the examples having been provided merely to demonstrate the practice of the subject invention. Those skilled in the art may readily select other EPDM, EPR or other similar olefin polymers including copolymers of ethylene and butene and ethylene and octene, according to the disclosure made hereinabove. Similarly, the invention is not necessarily limited to the particular fillers and processing material exemplified or the amounts thereof.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A method for covering a roof comprising the steps of:
   applying, to the roof being covered, layers of heat seamable sheet material prepared from an uncured non-black mineral filled polymeric composition of matter consisting essentially of:
   100 parts by weight of a semi-crystalline polymer selected from the group consisting of polyolefins prepared from monomers containing at least 2 carbon atoms,
   from about 20 to 300 parts by weight of a non-black mineral filler, per 100 parts of said polymer, and
   from about 20 to 150 parts by weight of a processing material, per 100 parts of said polymer;
   overlapping adjacent edges of said layers;
   heating the overlapped areas to about the softening point of the sheet material; and
   seaming the overlapped areas under sufficient pressure to provide an acceptable seam strength, said composition of matter having sufficient self-adhesion without the use of an adhesive.

2. A method, as set forth in claim 1, wherein said step of heating is conducted under a temperature of at least about 82° C.

3. A method, as set forth in claim 1, wherein said semi-crystalline polymer is selected from the group consisting of terpolymers of ethylene, propylene and diene monomer, ethylene-propylene copolymers, ethylene-butylene copolymers, and ethylene-octene copolymers.

4. A method, as set forth in claim 3, wherein said non-black mineral filler is a clay mineral filler selected from the group consisting of airfloated clays, water washed clays, calcinated clays, and chemically modified clays.

5. A method, as set forth in claim 3, wherein said semi-crystalline polymer is EPDM.

6. A method, as set forth in claim 5, wherein said processing material is selected from the group consisting of paraffinic oils, naphthenic oils and waxes and mixtures thereof.

7. A method, as set forth in claim 4, wherein said uncured polymeric composition of matter includes about 125 parts by weight of said clay mineral filler and about 75 parts by weight of processing oil.

8. A method, as set forth in claim 7, wherein said clay is chemically modified.

9. A method, as set forth in claim 7, wherein said clay is untreated.

10. A method, as set forth in claim 7, further comprising further comprising from about 0.3 to 2 parts by weight of a substituted benzotriazole, per 100 parts of said polymer.

* * * * *